(12) United States Patent
Brown et al.

(10) Patent No.: US 6,801,903 B2
(45) Date of Patent: Oct. 5, 2004

(54) COLLECTING STATISTICS IN A DATABASE SYSTEM

(75) Inventors: Douglas P. Brown, San Diego, CA (US); Jeetendra Chaware, Andhra Pradesh (IN)

(73) Assignee: NCR Corporation, Dayton, OH (US)

(*) Notice: Subject to any disclaimer, the term of this patent is extended or adjusted under 35 U.S.C. 154(b) by 402 days.

(21) Appl. No.: 09/976,634

(22) Filed: Oct. 12, 2001

(65) Prior Publication Data

US 2003/0088579 A1 May 8, 2003

(51) Int. Cl.⁷ .............................................. G06F 17/30
(52) U.S. Cl. ........................................... 707/2; 707/10
(58) Field of Search ..................................... 707/2, 10

(56) References Cited

U.S. PATENT DOCUMENTS

| | | | | |
|---|---|---|---|---|
| 5,303,383 A | | 4/1994 | Neches et al. | 395/500 |
| 5,625,815 A | * | 4/1997 | Maier et al. | 707/8 |
| 5,640,584 A | | 6/1997 | Kandasamy et al. | 395/800 |
| 5,864,842 A | | 1/1999 | Pederson et al. | 707/3 |
| 5,870,752 A | * | 2/1999 | Gibbons et al. | 707/102 |
| 5,884,299 A | | 3/1999 | Ramesh et al. | 707/2 |
| 5,950,188 A | * | 9/1999 | Wildermuth | 707/3 |
| 5,970,495 A | * | 10/1999 | Baru et al. | 707/102 |
| 6,223,171 B1 | * | 4/2001 | Chaudhuri et al. | 707/2 |
| 6,272,487 B1 | * | 8/2001 | Beavin et al. | 707/2 |
| 6,477,523 B1 | * | 11/2002 | Chiang | 707/2 |

OTHER PUBLICATIONS

Oracle Corporation, "SQL Language: Reference Manual, Version 6.0," pp. 5–1 to 5–5, 5–96 to 5–97 (1990).
Eugene Wong et al., ACM Transactions on Database Systems, vol. 1, No. 3, "Decomposition–A Strategy for Query Processing," pp. 223–241 (Sep. 1976).
P. Griffiths Selinger et al., ACM, "Access Path Selection in a Relational Database Management System," pp. 23–34 (1979).
Masaru Kitsuregawa et al., Institute of Industrial Science, University of Tokyo, "Query Execution for Large Relations on Functional Disk System," pp. 159–167 (1989).
U.S. patent application Ser. No. 09/976,632, filed Oct. 12, 2001.
U.S. patent application Ser. No. 09/977,038, filed Oct. 12, 2001.
U.S. patent application Ser. No. 10/039,283, filed Dec. 31, 2001.
U.S. patent application Ser. No. 09/608,977, filed Jun. 30, 2000.
D.D. Chamberlin et al., "Views, Authorization, and Locking in a Relational Data Base System," National Computer Conference, pp. 425–430 (1975).
D.D. Chamberlin et al., "Sequel 2: A Unified Approach to Data Definition, Manipulation, and Control," IBM Journal of Research and Development, vol. 20, pp. 560–575 (Nov. 1976).
M.W. Blasgen et al., "On The Evaluation of Queries in a Relational Data Base System," IBM Research Report RJ 1745, pp. 1–44 (Apr. 1976).
M.W. Blasgen et al., "Storage and Access in Relational Data Bases," IBM Systems Journal, No. 4, pp. 363–377 (1977).

* cited by examiner

*Primary Examiner*—Jack Choules
(74) *Attorney, Agent, or Firm*—Trop, Pruner & Hu, P.C.

(57) ABSTRACT

Statistics regarding at least one attribute (or column) of a table in a database system are collected using an enhanced mechanism for faster collection. The statistics collection is based on scanning a sample of rows of a given table, with the sample being less than all the rows of the table. The percentage of rows to be read is specified in a statement submitted to the database system. The database system then uses the specified percentage to read the sample rows from the table for collecting statistics on the at least one attribute.

37 Claims, 9 Drawing Sheets

COLLECTING STATISTICS IN A DATABASE SYSTEM

BACKGROUND

A database is a collection of stored data that is logically related and that is accessible by one or more users. A popular type of database is the relational database management system (RDBMS), which includes relational tables made up of rows and columns (also referred to as tuples and attributes). Each row represents an occurrence of an entity defined by a table, with an entity being a person, place, thing, or other object about which the table contains information.

To extract data from, or to update, a relational table in an RDBMS, queries according to a standard database-query language (e.g., Structured Query Language or SQL) are used. Examples of SQL statements include INSERT, SELECT, UPDATE, and DELETE.

As applications become increasingly sophisticated, and data storage needs become greater, higher performance database systems are used. One such database system is the TERADATA® database mangement system from NCR Corporation. The TERADATA® database systems are parallel processing systems capable of handling relatively large amounts of data. In some arrangements, a database system includes multiple nodes that manage access to multiple portions of data to enhance concurrent processing of data access in updates. In TERADATA® database management systems, concurrent data processing is further enhanced by the use of virtual processors, referred to as access module processors (AMPs), to further divide database tasks. Each AMP is responsible for a logical disk space. In response to a query, one or more of the AMPs are invoked to perform database access, updates, and other manipulations.

One of the goals of a database management system is to optimize the performance of queries for access and manipulation of data stored in the database. Given a target environment, an optimal query plan is selected, the optimal query plan being the one with the lowest cost (e.g., response time) as determined by an optimizer in the database system. The response time is the amount of time it takes to complete the execution of a query on a given system.

The optimizer calculates cost based on statistics of one or more columns (or attributes) of each table. Statistics enable the optimizer to compute various useful metrics. Typically, statistics are stored in the form of a histogram.

In database systems that store large tables, the cost of collecting statistics for such large tables can be quite high. As a result, some database users may choose not to collect statistics for columns of tables over a certain size. The lack of statistics for some tables may adversely affect operation of certain components in the database system, such as the optimizer and other tools.

SUMMARY

In general, a mechanism for faster collection of statistics in a database system is provided. For example, a method for use in a database system comprises receiving a request to collect statistics of at least an attribute of table, and collecting statistics for the attribute based on reading a sample of rows of the table, the sample being less than all the rows of the table.

Other or alternative features will become apparent from the following description, the drawings, and the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
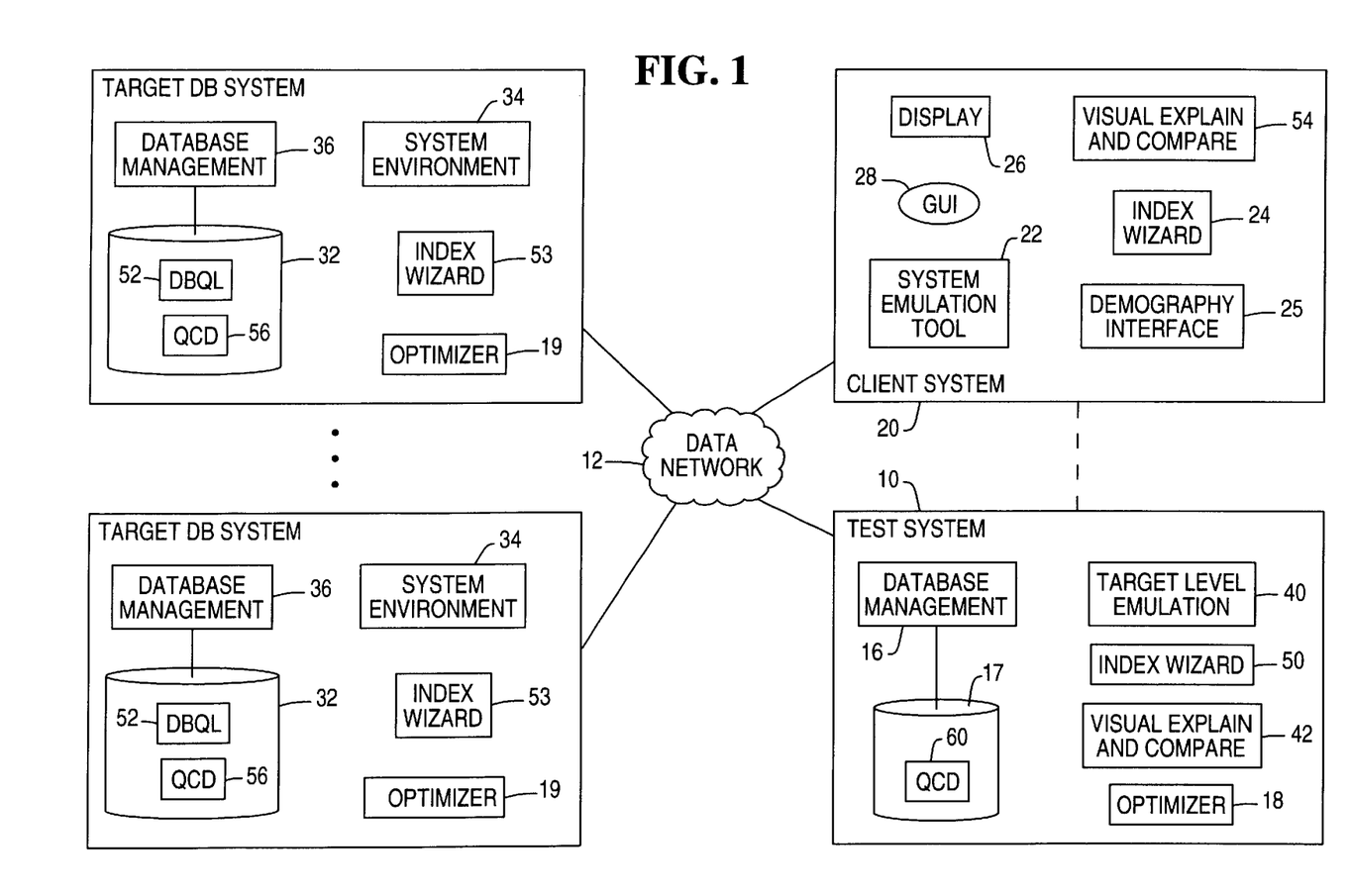
FIG. 1 is a block diagram of an example network of systems, including target database systems, a client system, and a test system.

FIG. 1 shows an example arrangement of several target database systems (14A, 14B), a test system 10, and a client system 20. In one example, the target database system 14A is located at a first customer site, while the target database system 14B is located at a second customer site. Essentially, each target database system 14 is a production system that is used by a customer.

The test system 10 is used to test database software before the database software is released for loading on the target database systems 14. Note that although a separate client system 20 and test system 10 are shown, they can actually be combined into one system.

The client system 20 includes a system emulation tool 22, an index wizard client module 24, a visual explain and compare module 54, and a demography interface 25. The tasks of each of these modules are described in further detail below. In some embodiments, the index wizard client module 24, in combination with an index wizard server module 50 executable in the test system 10 or an index wizard server module 53 in a target database system 14, provide an improved mechanism of performing index selection on tables stored in a database system, such as one of the target database systems 14A, 14B.

An index is a structure in a database system that provides relatively rapid access to rows of a table based on the values of one or more columns. An index stores data values and pointers to rows in the base table where those data values occur. An index can be arranged in ascending or descending order, so that the database management system can quickly search the index to find the particular value in the base table. The database management system follows the associated pointer to locate the row in the base table containing the value.

In some TERADATA® database management systems, a primary index and one or more optional secondary indexes are defined for each table. In a database system having multiple access modules, such as access module processors (AMPs) in a TERADATA® database management system, the primary index is used for assigning a data row to a particular one of plural access modules. In effect, the primary index determines the distribution of rows of a table across multiple access modules of the database system.

A secondary index is stored in a sub-table of this database system. A "sub-table" is also a relational table. The secondary index does not affect distribution of a table across multiple access modules. However, the secondary index does add to overhead, since the secondary index is stored in sub-tables. Despite the extra storage required, secondary indexes, if properly used, can enhance database performance.

Collectively, the index wizard client module 24 and index wizard server module 50 or 53 are referred to as an "index wizard tool." More generally, the index wizard tool is referred to as an index selection tool. The index wizard tool or index selection tool is one example of a tool that uses the collect sample statistics technique in accordance with some embodiments. However, other tools or modules are also capable of using the collect sample statistics technique. Such other tools or modules include an optimizer module (18 or 19) and other analysis tools.

Each target database system 14 includes database management software 36 that manages access of data in a respective database made up of plural relational tables (stored in a storage system 32). In accordance with some embodiments, the database is distributed across plural nodes in each target database system 14. Such a multi-node parallel processing system is referred to as a massively parallel processing (MPP) system. Alternatively, the target system 14 is a single-node system having plural processors (sometimes referred to as a symmetric processing system or SMP). In yet another embodiment, a single-node system having a single processor can be used for implementing a database system.

As used here, a "parallel system" refers to a multi-node multi-processing system, a single-node system having plural CPUs (e.g., an SMP system), or a single-node system running multiple virtual processors on one or more CPUs. A "parallel database system" or "parallel database" refers to a database system or database implemented in the parallel system.

Each target database system 14 is associated with a system environment 34, which is made up of system-specific information as well as database-level information of each target system. Thus, as used here, "environment information" of a target database system refers to the system-specific information, database-level information, or any portion of the system-specific or database-level information.

System-specific information includes such information as the number of nodes in the target system, the number of processors or central processing units (CPUs) per node, the number of virtual processors in each node, and other system information. Database-level information includes statistics, random samples of virtual processors, data manipulation language (DML) statements, data definition language (DDL) statements, and the actual data of the database itself.

Statistics include information on how data is structured in the database, the number of rows in a table and approximations of the distributions of particular data values in columns (or attributes) of a table (or relation). Random samples refer to samples captured from access modules. The random samples contain the data demographics of the database portions managed by the access modules. DDL statements affect the structure of database objects, and may include statements such as SQL (Structured Query Language) ALTER statements (to redefine or alter databases, tables, indexes, etc.), CREATE statements (to create databases, indexes, tables, etc.), and so forth. DML statements are statements that manipulate data, such as the COMMIT statement (to make permanent all changes since the beginning of a transaction), DELETE statement (to remove rows from a table), INSERT statement (to add a new row to a table), SELECT statement (to perform a query by selecting rows and columns from one or more tables), UPDATE statement (to change data in a table), and so forth.

The target database systems 14A, 14B are coupled to a data network 12. The data network 12 can be a private network, or it can be a public network such as the Internet. Communications over the data network 12 according to one of various techniques and protocols.

The system emulation tool 22 in the client system 20 is able to export target-level emulation (TLE) data from the target database system 14A, 14B over the data network 12. Once the TLE data is stored in data files in the client system 20, the system emulation tool 22 sends the TLE data to the test system 10. This is referred to as importing the TLE data to the test system 10.

The TLE data exported by the system emulation tool 22 includes environment information, such as cost-related information, statistics, random samples, DDL statements, DML statements, actual database data, and so forth, from the database target systems 14. The environment information is then imported to the test system 10, with the environment information maintained as target-level emulation data 40. With the ability to export TLE data from a target database system 14 and to import the TLE data into the test system 10, an accurate test environment (to emulate a target database system 14) can be created in the test system 10 in which various tests can be performed. Providing an accurate test environment can be beneficial if the test system 10 is a relatively unsophisticated system (when compared to a target database system 14). Thus, for example, a laptop computer can be used to emulate an MPP database system by emulating the environment of the MPP system.

The test system 10 further includes an optimizer module 18 that selects a query plan from among several possible query plans for a given SQL query that accesses data in a database (stored in storage system 17) managed by database management software 16. For more accurate performance determinations, the optimizer module 18 uses the target-level emulation data 40 that has been imported from the system emulation tool 22 to form a test environment in the test system 10 to emulate a desired target system. Running in the emulated environment, the optimizer module 18 identifies and selects the most efficient query plan (or one of the more efficient query plans) for a given query. Based on test performed in the emulated environment, expected performance of various queries in the target database system can be determined. As explained further below, the optimizer module 18 is executed in the emulated environment to perform index selection.

For a given query, the optimizer module 18 identifies a query plan that has the lowest, or one of the lowest, response times. The response time is the amount of time it takes to complete the execution of the query. One technique of query optimization uses a cost model to estimate the response times of a given query plan and to search the space of query plans that return a plan with low cost. In the cost-based optimization model, different methods for doing a unit of work are compared and the most efficient method is selected (the plan with the lowest cost). Because a number of alternatives can be quite large, especially in a parallel database system with a large number of nodes storing a large relational database (with many tables), the optimizer module 18 uses statistics and/or sampling techniques to reduce the search space in optimizing queries. Each target database system 14 also includes an optimizer module 19.

A query plan generated by the optimizer module 18 is stored in a table of a query capture database (QCD) 60, which is made up of several tables. The query plans captured in the QCD 60 are available to various analysis tools, including the index wizard server module 50.

The test system 10 can optionally include a visual explain and compare tool 42, which is in addition to or in place of the visual explain and compare tool 54 in the client system 20. The visual explain and compare module 42 or 54 provides a graphical user interface in which steps of a query plan are displayed. Each step of the query plan is depicted as an icon, with the icons connected by lines to represent the flow of the steps in the query plan. The icons are designed to represent objects such as relational algebraic (e.g., select, project, join); physical algebraic operators such as nested join, merge join, hash join, and so forth; tables; sorts; redistribution; views; duplications; and other objects.

Another feature of the visual explain and compare module 42 or 54 is its ability to graphically or visually compare plural query plans for a given query, with the plural query plans generated under different conditions. This provides the user with the ability to analyze differences between different query plans. Thus, for example, the comparison can be made of query plans for different indexes selected by the index wizard server module 50 that runs in the test system 10.

The index wizard tool automates the index selection process by recommending a set of indexes for a particular workload, which corresponds to a set of queries that are captured from a target database system 14. Thus, the index wizard tool takes as input a workload from a specified system. The workload includes a set of SQL queries such as SELECT, UPDATE, INSERT, and DELETE statements. The workload can also be a single SQL query.

Based on the workload, the index wizard tool recommends a set of indexes that are appropriate for the given workload. If the target database systems 14A, 14B are TERADATA® database systems from NCR Corporation, then the indexes recommended are secondary indexes. The indexes recommended can also be primary indexes. However, note that although reference is made to selecting secondary indexes in this discussion, the invention is not to be limited in scope to selection of secondary indexes. In other types of database systems, other types of indexes can be selected. Thus, the term "index" or "indexes" is intended to cover any index that can be used to enhance table access in a database system. There are several types of secondary indexes, including a unique secondary index (USI) and a non-unique secondary index (NUSI).

The workload can be generated by logging activity in each of the target database systems 14A, 14B. The logged queries are stored in a database query log (DBQL) 52 in each target database system 14. In addition to storing the query, the database query log 52 can also store performance related data for requests such as an account identifier, usage of objects, rows returned, start and finish times, and so forth. The database query log can include various DBQL tables, including a rule table, a main table, a table to store query objects, a table to store query step information, a table to store the SQL statement of a query, a table to store summary and threshold information, and a table to store explain information.

Alternatively, instead of retrieving the workload from the database query log 52, the workload can be retrieved from a QCD 56 in the target database system 14. The visual explain and compare tool 42 or 54, the system emulation tool 22, and the index wizard tool are considered analysis tools that are used to help determine the performance of database systems and to suggest the tuning of various elements of the database system, such as indexes, that will enhance database performance. Each of the analysis tools uses demographics information that is collected by demography interface 25.

Figure 2:
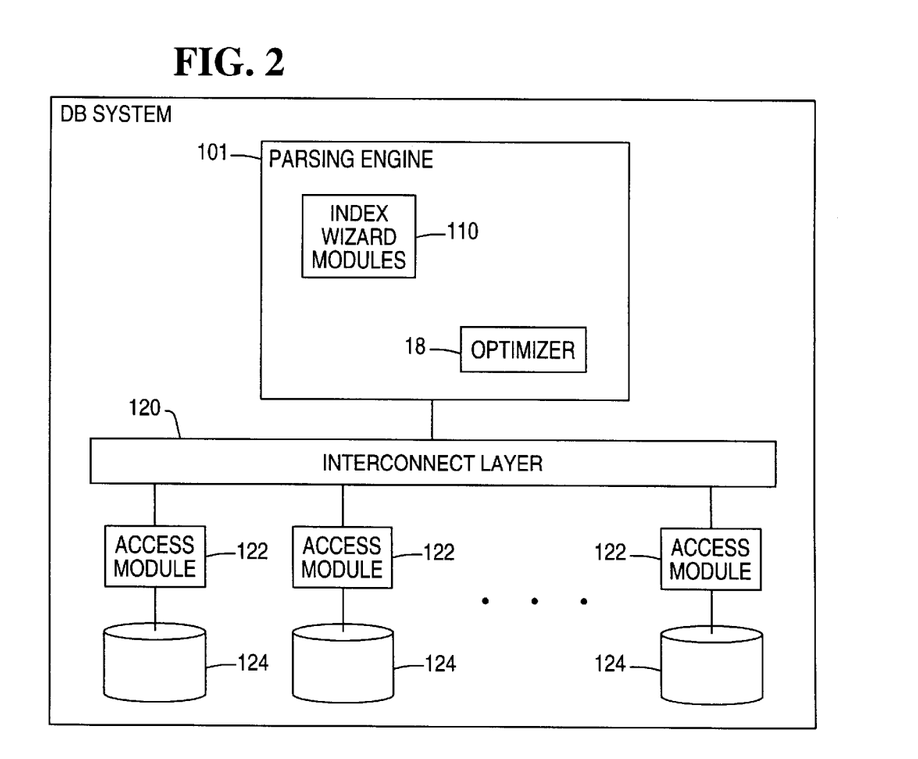
FIG. 2 is a block diagram of an example database system.

FIG. 2 shows an example arrangement of components in a database system 100. The database system 100 can either be the test system 10 or a target database system 14. The database system 100 includes a plurality of access modules 122 that control access to respective storage modules 124. Each access module 122 creates, modifies, or deletes definitions of tables; inserts, deletes, or modifies rows within the tables; retrieves information from definitions in tables; and locks databases and tables. In one example, each access module 122 is an access module processor (AMP), which is a virtual processor implemented in software. An example of an AMP is the AMP used in some TERADATA® database systems from NCR Corporation. The access module 122 can each reside on a separate node in the database system 100, or alternatively, multiple access modules 122 can reside on each node of the database system 100.

The access modules 122 are interconnected by an interconnect layer 120. Also included in the database system is a parsing engine 101. The parsing engine 101 generally receives queries and parses each query into actions to be performed by the access modules 122. The parsing engine 101 includes the optimizer module 18 along with other components. The parsing engine 101 includes various index wizard components to perform predicate analysis, candidate index enumeration, and index analysis.

In accordance with some embodiments of the invention, a faster mechanism is provided for collecting statistics of columns of a table in a database system. Rather than collect statistics based on a full table scan (where each row of the table is read), statistics are collected based on reading a sample (that is less than all the rows) of a table. The sample is set by specifying a percentage, with the percentage indicating the percentage of rows to read from the base table in collecting the statistics. In accordance with one embodiment, the statement for collecting statistics is as follows:

```
COLLECT {STATISTICS | STATS | STAT}
[FOR SAMPLE <percentage> [PERCENT] INTO <QCDName>]
[ON] [TEMPORARY] <TableName>
[(COLUMN <Name>)]
{INDEX {<Name> | (<IndexColumn> [{, <IndexColumn>}...])}].
```

In the COLLECT STATISTICS statement above, the FOR SAMPLE element indicates that the collection of statistics is to be based on a sample of a base table (rather than the entire table). The <percentage> element specifies the sample data size as a percentage of the total set of rows of each access module of a database system. The INTO <QCDName> element indicates the QCD into which the statistics information is to be stored. The TEMPORARY element indicates that statistics is to be collected on a temporary table. The INDEX element indicates that the statistics are to be collected for index sub-tables as well as statistics for specified base tables. As noted above, a sub-table is used to store a secondary index of a corresponding base table.

Figure 3:
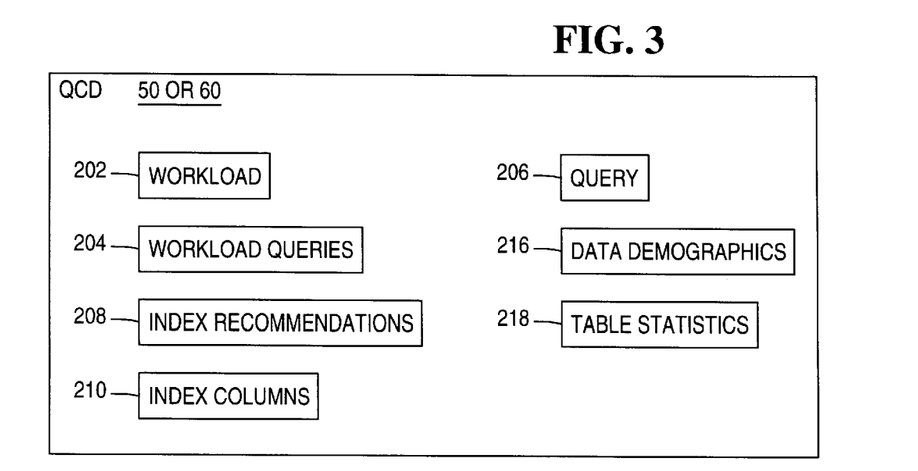
FIG. 3 is a block diagram of a query capture database (QCD).

The statistics collected are saved into a TableStatistics table 218 of the QCD 56 or 60, as shown in FIG. 3. This is contrasted to some other types of collect statistics operations, in which statistics are stored in a data dictionary. However, the ultimate storage location of statistics is not intended to limit the scope of the invention.

The COLLECT STATISTICS FOR SAMPLE statement can be submitted by an application. This application presents a user interface to receive a percentage value, such as a Set Statistics Sample Size screen 500 in FIG. 12. In the illustrated example, multiple fields to receive percentage values for different table sizes are provided. In an alternative arrangement, only one field is provided to receive a percentage value.

Figure 12:
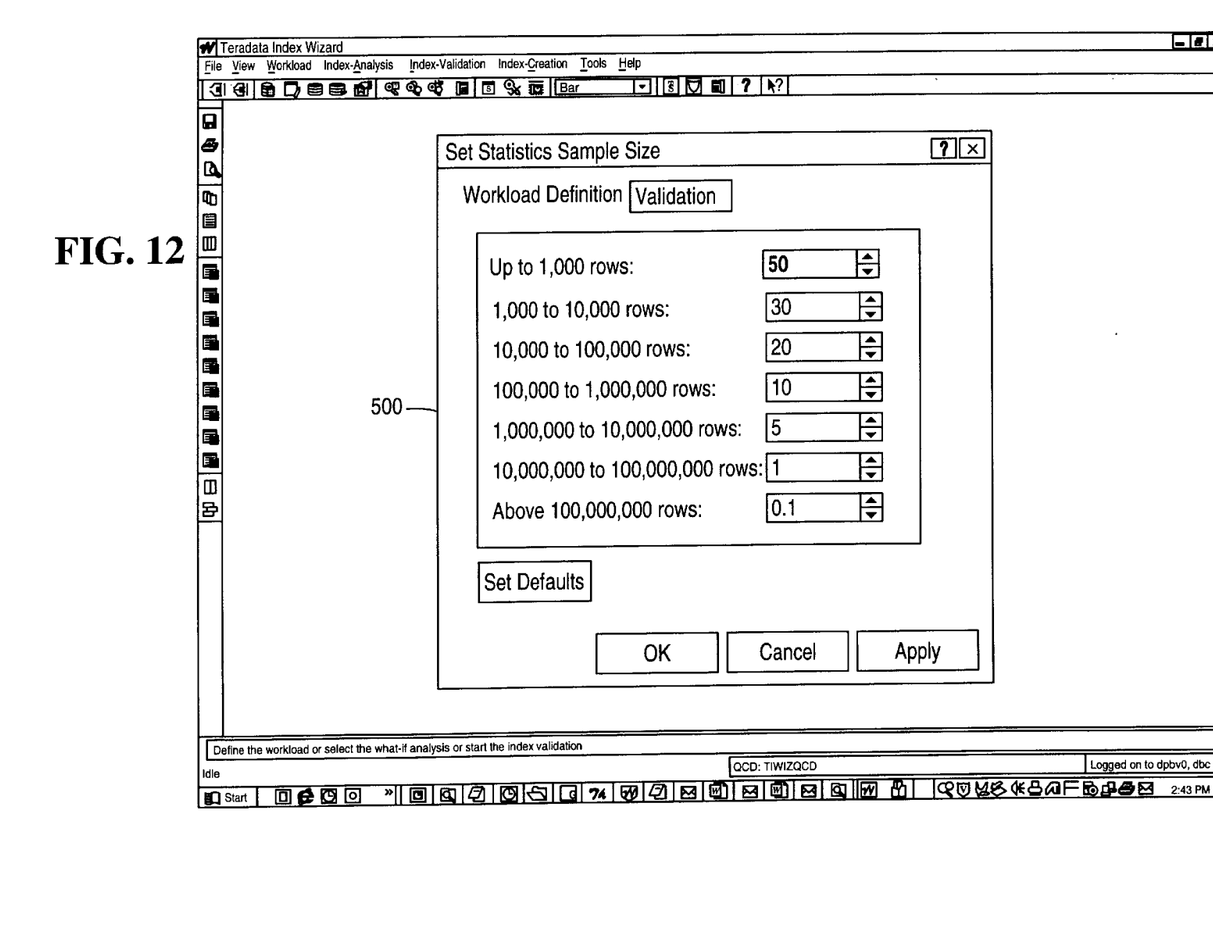
FIG. 12 illustrates a graphical user interface screen containing fields to receive percentage values to specify a sample size for collecting statistics.

In FIG. 12, for tables having up to 1000 rows, 50% is set. For tables having 1000 to 10,000 rows, 30% is set. For tables having 10,000 to 100,000 to 1,000,000 rows, 10% is set. For tables having 1,000,000 to 10,000,000 rows, 5% is set. For tables greater than 10,000,000 rows, 1% is set. Other user-specified percentages can be specified.

Figure 4:
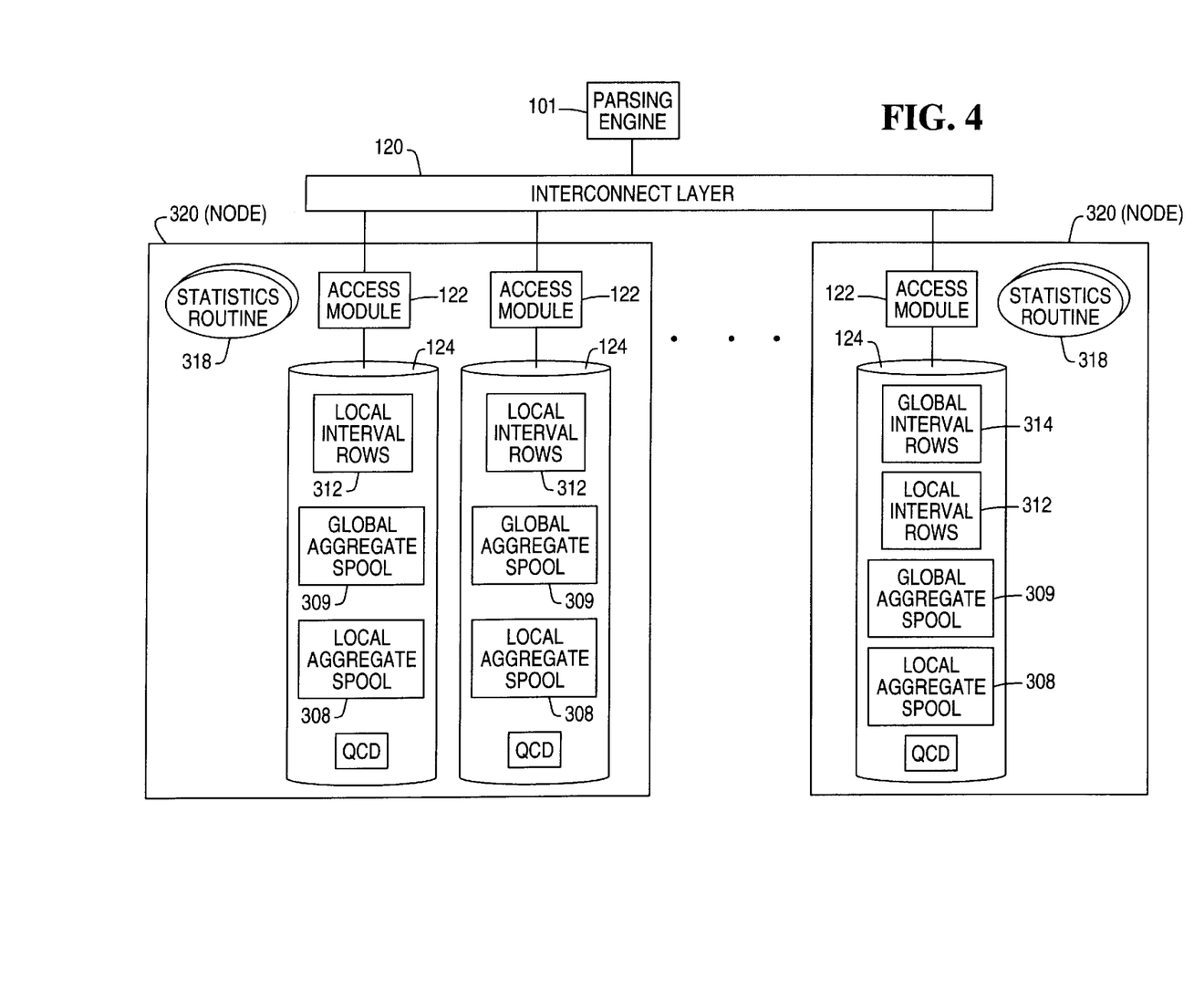
FIG. 4 illustrates data structures stored in the database system of FIG. 2, the data structures being used for collecting sample statistics.
Figure 5:
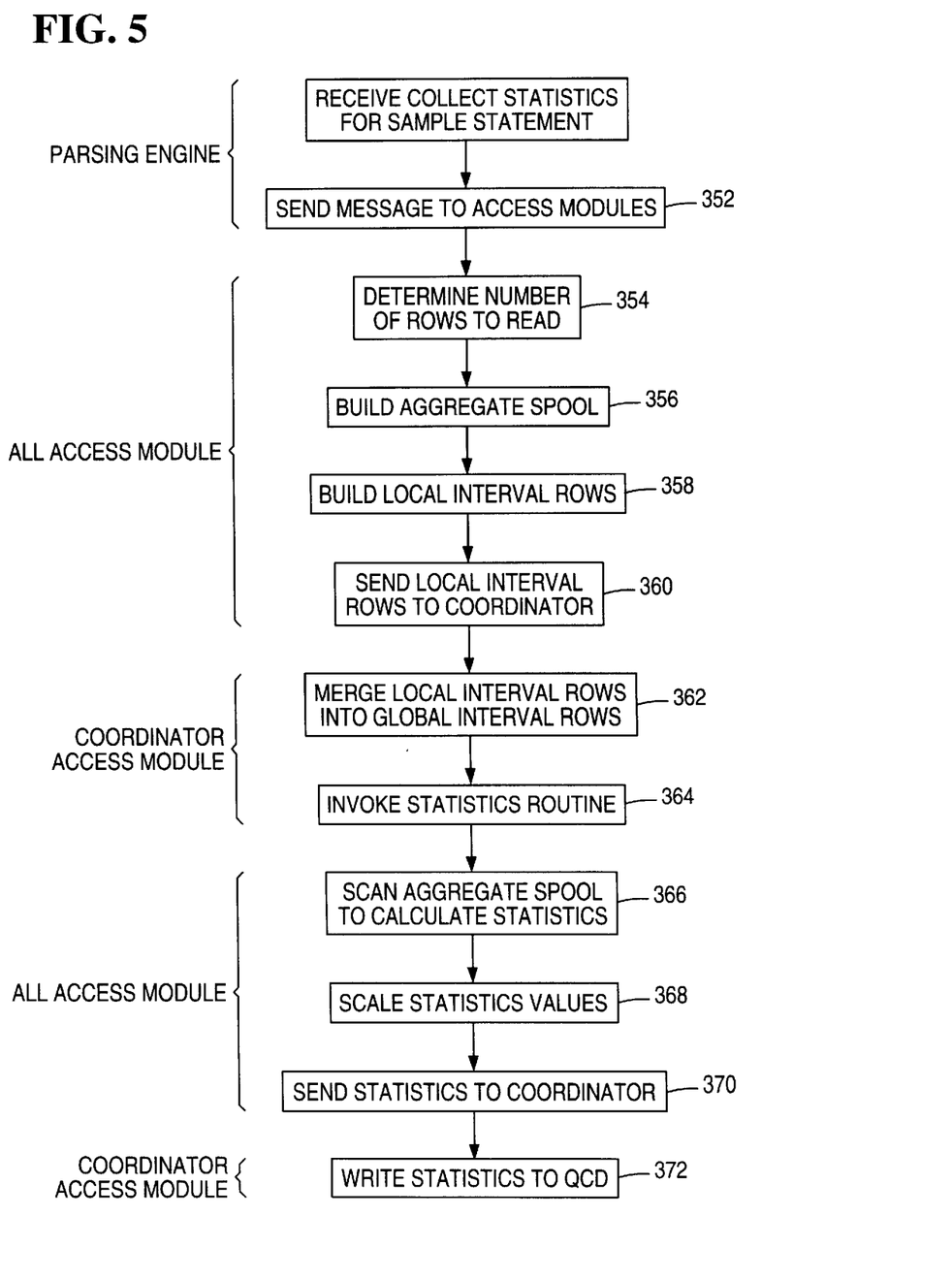
FIG. 5 is a flow diagram of a process of collecting sample statistics in accordance with an embodiment of the invention.

In describing the mechanism of collecting statistics based on a sample of a table, reference is made to FIGS. 4 and 5. In the example arrangement of FIG. 4, two access modules 122 are located in one node 320 while another access module 122 is located in another node 320.

The parsing engine 101 receives all queries that are submitted to the database system, including the COLLECT STATISTICS FOR SAMPLE statement. In response to receipt of this statement, the parsing engine 101 sends (at 352) a message containing a SAMPLE flag and a PERCENTAGE field to each access module in the system. The SAMPLE flag indicates to each access module 122 that collection of statistics is based on a sample. The PERCENTAGE field specifies the percentage of rows of a given table that each access module is to read for collecting statistics. The message also identifies the table for which the statistics is to be collected as well as the column(s) for which statistics are desired. Also, an indication is provided regarding whether statistics are also to be collected for the index sub-table.

Upon receiving the message, each access module 122 determines (at 354) the number of rows to read from the specified table stored on that access module based on the PERCENTAGE field in the message. Reading a percentage (less than 100%) of rows of a table can be accomplished in one of several different ways. For example, the first M rows of the table can be read, where M rows make up the specified percentage of all the rows. Alternatively, every Nth row is read, with N set such that the specified percentage of rows is read.

In each access module 122, an aggregate spool is built (at 356). Building the aggregate spool includes two phases, a local aggregation phase (that occurs within each access module) followed by a global aggregation phase. Local aggregation essentially performs a group by on a column (or attribute) of a source table to combine duplicate values. In addition, an aggregate function COUNT( ) is performed on the target attribute of the source table so that the numbers of duplicate values are counted. Thus, the group by operation combines duplicate values of an attribute, while the COUNT( ) function counts the number of rows that have the duplicate value. This requires a scan of rows of the specified table (which can be a primary or base table or a sub-table containing a secondary index). Note that only a percentage (less than 100%) of the rows are scanned in the group-by and COUNT( ) operations. As a result, (value, count) pairs are computed, with the (value, count) pairs outputted to corresponding rows of a local aggregate spool 308. The parameter "value" refers to the value of the attribute scanned, and the parameter "count" refers to the number of occurrences of that value.

Following local aggregation, global aggregation is performed, which involves redistribution of the local aggregate spool among the multiple access modules 122. A goal of the redistribution is to locate equal (value, count) pairs on the same access module 122 so that more accurate statistics can be collected. After all rows have been redistributed, a further group by is performed to combine duplicate values on each access module 122. Also, the row counts are updated to indicate the number of rows containing each duplicate value. The updated (value, count) pairs are stored in a global aggregate spool 309. Note that the local aggregate spool 308 and global aggregate spool 309 can actually be the same spool, with the contents of the spool updated by both the local and global aggregation phases (sorting and redistribution).

The use of local aggregation and global aggregation depends on the type of attribute for which statistics is to be collected. If the attribute is a non-index attribute, then both local aggregation and global aggregation are used. However, if the target attribute is a unique secondary index (USI), then only the local aggregation is performed. However, if statistics are collected for a non-unique secondary index (USI), then only the global aggregation is performed because the NUSI sub-table can serve as the appropriate local aggregation result. The content of the global aggregate spool 309 is subsequently accessed to collect statistics, as described below.

After the aggregate spool 309 has been built, each access module 122 next builds (at 358) local interval rows 312, where each row represents one interval. Statistics are collected for intervals, with intervals 1-M defining the actual frequency distribution for the attribute. The intervals collectively are referred to as a "histogram." For example, if M intervals are used for collecting statistics, then a table is divided into M portions, with each portion corresponding to a respective interval.

In building the local interval table rows (at 358), two parameters are collected: a maximum value (MaxVal) and the number of rows in the interval. The maximum value MaxVal represents the maximum value of the attribute in that interval.

Each interval row 312 is then sent (at 360) from each access module 122 to a coordinator access module (which can be any one of the access modules in the database system). The coordinator access module is designated as the access module responsible for merging the local interval rows 312. At the coordinator access module, the local interval rows 312 are merged (at 362) into global interval rows 314. The coordinator access module then invokes (at 364) a statistics routine 319 in each of the nodes 320 (FIG. 4). Note that one statistics routine 319 can be invoked per access module 122. The statistics routine 319 associated with each access module 122 scans (at 366) the aggregate spool 309 in that access module to calculate the statistics information. According to one embodiment, the statistics information that are computed include the following: MaxVal (which is the maximum value covered by the interval), Mode (which is the most frequent value in the interval), ModeFreq (which is the number of rows with the most frequent value), Values (which is the number of values not equal to the Mode value), and Rows (which is the number of rows not equal to the Mode value).

Note that these values are examples of statistics information that can be collected for one or more columns (or attributes) of a table. Other types of statistics information regarding characteristics of one or more attributes can also be collected.

Next, certain of the statistics values are scaled (at 368). Note that the statistics information was computed based on a sample (less than all) of rows of a given table. As a result, the values ModeFreq and Rows are scaled according to the percentage value specified in the COLLECT STATISTICS FOR SAMPLE statement. For example, if the specified percentage is 10%, then values of each of ModeFreq and Rows are multiplied by 10 (1/0.1) to arrive at an approximation of the actual ModeFreq and Rows values if the a full table scan had been performed to collect statistics. Other scaling algorithms can be used in other embodiments.

Each access module then sends the collected statistics information (at 370) back to the coordinator access module. The coordinator access module then writes (at 372) the collected statistics into the TableStatistics table 218 in the QCD 56 or 60. Note, however, that sending the collected statistics back to the coordinator access module may not be needed. Each access module can perform the writing of the statistics information directly into the QCD.

To create the TableStatistics table 218, the following statement can be used:

```
CREATE TABLE TableStatistics (
    MachineName
    TableName
    DatabaseName
    IndexName
    ColumnName
    CollectedTime
    SamplePercent
    IndexType
    IndexID
    StatisticsInfo
)
```

The attribute MachineName is the system name on which the table resides. The attribute TableName is the name of the table, and DatabaseName is the name of the containing database or user. IndexName is the name of the index (in case an index is named, otherwise a null value is used). ColumnName is the name of a column (if the statistics are collected for a column). CollectedTime indicates the timestamp value when the statistics information is collected.

The attribute SamplePercent is the sample percent of rows that are read to collect the statistics information. IndexType indicates whether the details correspond to an index. If so, then the column belongs to an index indicated by IndexID. If not, then the statistics are collected for a column. The field StatisticsInfo contains the statistics information that is collected, including MaxVal, Mode, ModeFreq, Values, Rows.

In accordance with some embodiments, another statement that affects statistics in the QCD 56 or 60 is the following statement:

```
DROP STATISTICS
    [FROM <QCDName>]
    [ON {[TEMPORARY] <TableName>|<join_index_name>}
    [{COLUMN <Name>}]
    {INDEX {<Name> | (<IndexColumn> [{, <IndexColumn>}...])}].
```

This statement causes statistics that are collected in the TableStatistics table 218 of the QCD to be deleted. If a column or index is specified, then the statistics corresponding to the column or index are deleted. If a column or index is not specified, then all of the statistics on the table are deleted from the QCD.

Using the collect sample statistics technique described in accordance with some embodiments, a faster mechanism is provided to collect statistics of tables. The statistics can be used by various tools, including the optimizer, index wizard tool, and other tools or modules. As database applications become more sophisticated and the amount of data stored increase, tables can be quite large. Using the collect sample statistics mechanism allows statistics to be collected for these tables without sacrificing large amounts of resources to the statistics collection.

The following describes some tasks performed by the index wizard tool, which uses the collect sample statistics selection. A more detailed explanation of the index wizard tool is provided in the U.S. Ser. No. 09/977,038, filed on Oct. 12, 2001, hereby incorporated by reference. However, it is noted that the collect sample statistics mechanism can be used by other tools or modules in the database system, including the optimizer module 18 or 19, system emulation tool 22, and visual explain and compare tool.

Figure 6:
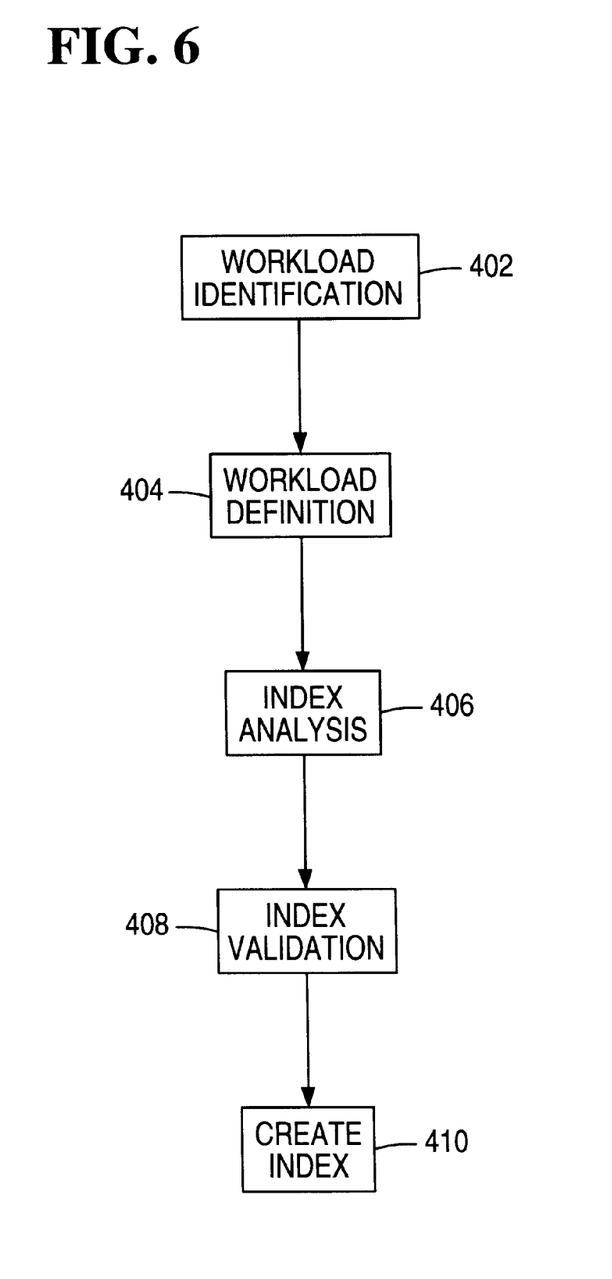
FIGS. 6–11 illustrate tasks performed by an index wizard tool.

FIG. 6 shows the general tasks performed by the index wizard tool, in accordance with one embodiment. First, the index wizard tool performs (at 402) workload identification, which involves the identification of the SQL statements for performance analysis. The workload can be input from the database query log 52, or alternatively, the workload is captured from the QCD 56 where execution plans are saved.

Next, the workload is defined (at 404) on the database system, which can be either the test system 10 or a target database system 14. After definition of the workload, the index wizard tool performs index analysis (at 406) on the defined workload to generate the index recommendations. The index recommendations are then validated (at 408) on the target database system 14. In the validation phase, the cost of a modified plan (with the recommended index) is compared with the cost of the original plan (without the recommended index). After validation, the index wizard tool applies the index recommendations on the target database system 14, which involves the submission of one or more DDL statements to the target database system 14 to create (at 410) the recommended indexes.

The index identification (at 402) is performed by the index wizard client module 24 in the client system 20, such as in response to user input. Thus, for example, the user (through one or more graphical user interface screens presented in the display 26 of the client system 20) can issue queries to the DBQL to identify queries that are candidates for performance improvement. Alternatively, using the visual explain and compare module 54, a query can be submitted to the QCD to extract the queries. Yet another option is for the user to type in specific SQL statements manually in the graphical user interface screen provided by the index wizard client module 24.

Figure 7:
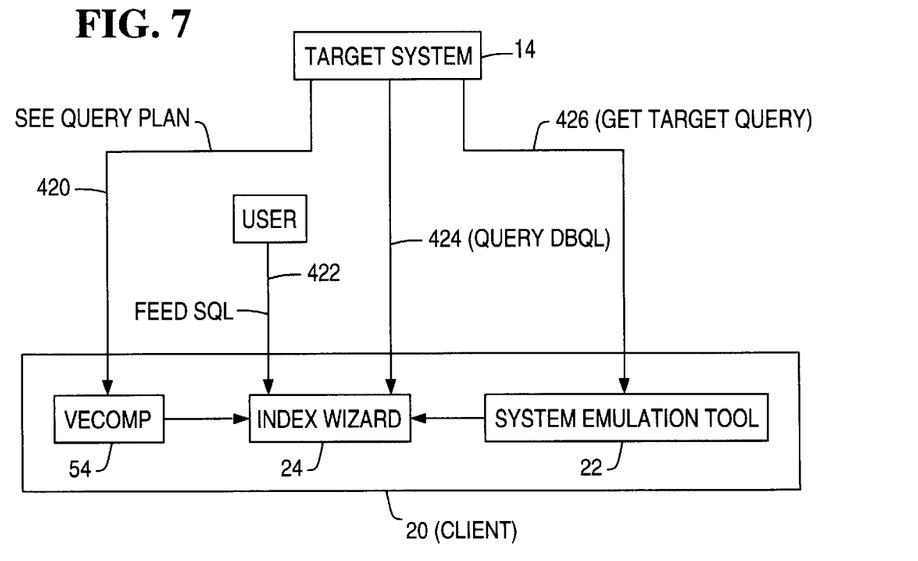

As shown in FIG. 7, the query plan(s) are retrieved (at 420) from the QCD 56 in the target database system 14. Alternatively, the user can manually type in the query(ies) that make up the workload (at 422). The input can also be input (at 422) from a file stored somewhere (either in the client system 20 or in the target database system 14). Another option is for the index wizard client module 24 to fetch (at 424) DBQL data from the database query log 52 in the target database system 14. As yet another option, one or more queries are exported (at 426) using the system emulation tool 22 to be included in the workload that is input to the index wizard client module 24.

Figure 8:
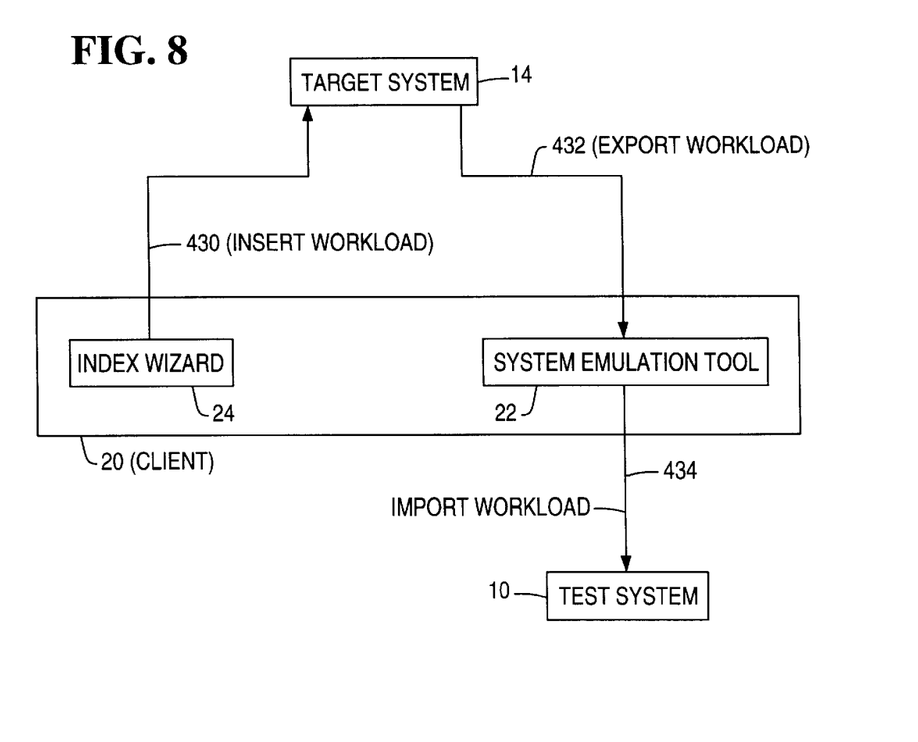

FIG. 8 illustrates the workload definition task (404). The workload is registered in the target database system 14 to enable the use of workload data for index analysis. After identifying the set of SQL statements (at 402) that are potential candidates for performance tuning, the user submits (at 430) SQL statements with an INSERT EXPLAIN modifier from the index wizard client module 24 to capture query plans in the QCD 56 of the target database system 14. Once the plans are captured in the QCD 56, the workload is defined by associating the queries with the workload.

As shown in FIG. 3, the QCD 56 includes several tables, including a Workload table 202 and a WorkloadQueries table 204. The Workload table 202 is used to register the workload name in the QCD 56. The workload has a workload identifier (ID) that is used to link the workload with queries. The WorkloadQueries table 204 has the association of queries with a given workload.

The following provides an example of defining the workload. First, the query plans are captured in the QCD 56 using the INSERT EXPLAIN statement modifier. Example statements are provided below:

INSERT EXPLAIN FOR 10 WITH STATISTICS INTO MyQCD SELECT*FROM tab1;
INSERT EXPLAIN FOR 10 WITH STATISTICS INTO MyQCD SELECT*FROM tab2 WHERE tab2.j BETWEEN 10 AND 100;
INSERT EXPLAIN FOR 10 WITH STATISTICS INTO MyQCD SELECT*FROM tab3.

As specified in the example statements, the QCD 56 has a name MyQCD. The queries specified in the three example statements are as follows:

SELECT*FROM tab1;
SELECT*FROM tab2 WHERE tab2.j BETWEEN 10 and 100;
SELECT*FROM tab3.

These queries are stored in a Query table 206 in the QCD 56. The "WITH STATISTICS" clause indicates that demographics information is desired. Demographics information includes information such as disk utilization information of a table on each access module, the row count and average row size of a table on each access module, column statistics, and blocks distribution, as examples. The demographics information is stored in a DataDemographics table 216 (FIG. 3) by the demography interface 25.

The "FOR 10" clause indicates the number of times (frequency) the specified SQL statement is executed. In this example, the frequency is 10.

A row is then inserted into the Workload table 202 to register the workload name. A workload ID is obtained for the workload. Using query IDs returned in response to the INSERT EXPLAIN statements, all queries from the Query table 206 along with the associated query frequencies are inserted into the WorkloadQueries table 204.

The insertion of data into the workload table 202 and the WorkloadQueries table 204 can be accomplished using macros or other predefined routines that can be invoked by the index wizard tool.

Additional query plans can be captured using statements with the INSERT EXPLAIN modifier. Using query IDs, the associated queries and corresponding frequencies are inserted into the WorkloadQueries table 204. Entries in the WorkloadQueries table can also be deleted.

As further shown in FIG. 8, the workload is exported (at 432) from the QCD 56 in the target database system 14. The exporting is performed by the system emulation tool 22. The system emulation tool 22 then imports the workload (at 434) into the QCD 60 of the test system 10 for index analysis.

Figure 9:
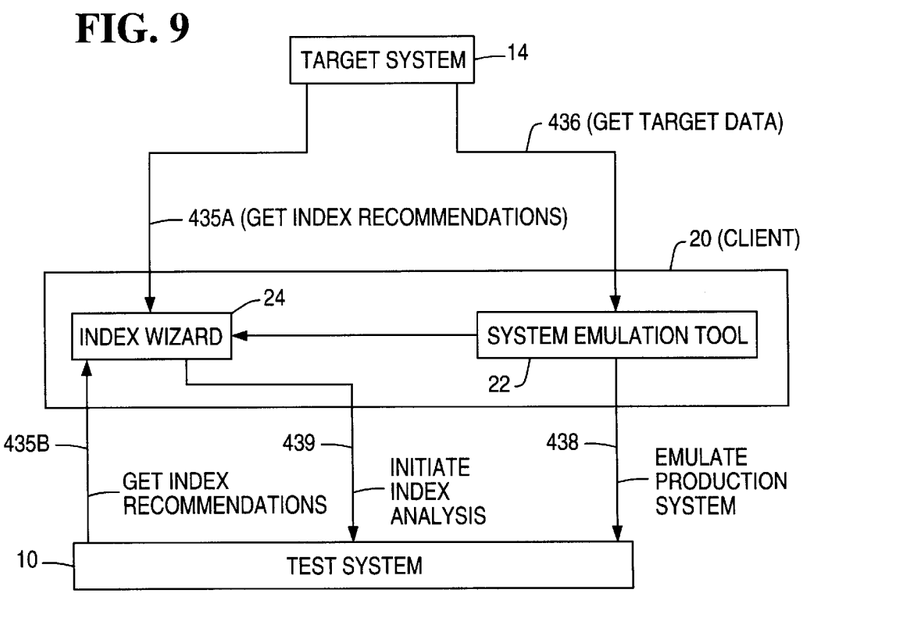

Following workload definition (404 in FIG. 6), index analysis (406) is performed. As shown in FIG. 9, the index wizard client module 24 retrieves the index recommendations from either the QCD 56 in the target database system 14 (at 435A) or from the QCD 60 in the test system 10 (at 435B). The client system 20 invokes the system emulation tool 22 to obtain TLE data (cost parameters, random AMP samples, and so forth) from the target database system 14. The system emulation tool 22 exports (at 436) the TLE data from the target database system 14. Next, the TLE data from the target database system 14 is imported (at 438) into the test system 10 at a session level to emulate the target database system 14.

Index analysis is then performed in the test system 10 by the index wizard server module 50. The workload to be analyzed is submitted in an INITIATE INDEX ANALYSIS statement sent (at 439) from the index wizard client module 24 to the test system 10.

The index recommendations generated in response to this statement are stored in the IndexRecommendations table 208 and an IndexColumns table 210 of the specified QCD. The IndexRecommendations table 208 captures the recommendations obtained during index analysis, while the IndexColumns table 210 captures the columns of the indexes recommended for the queries.

The objective of the index analysis is to recommend a set of indexes on the different tables referenced in the workload (and listed in the INITIATE INDEX ANALYSIS statement) that provides the maximum improvement in the response time of the workload.

Figure 10:
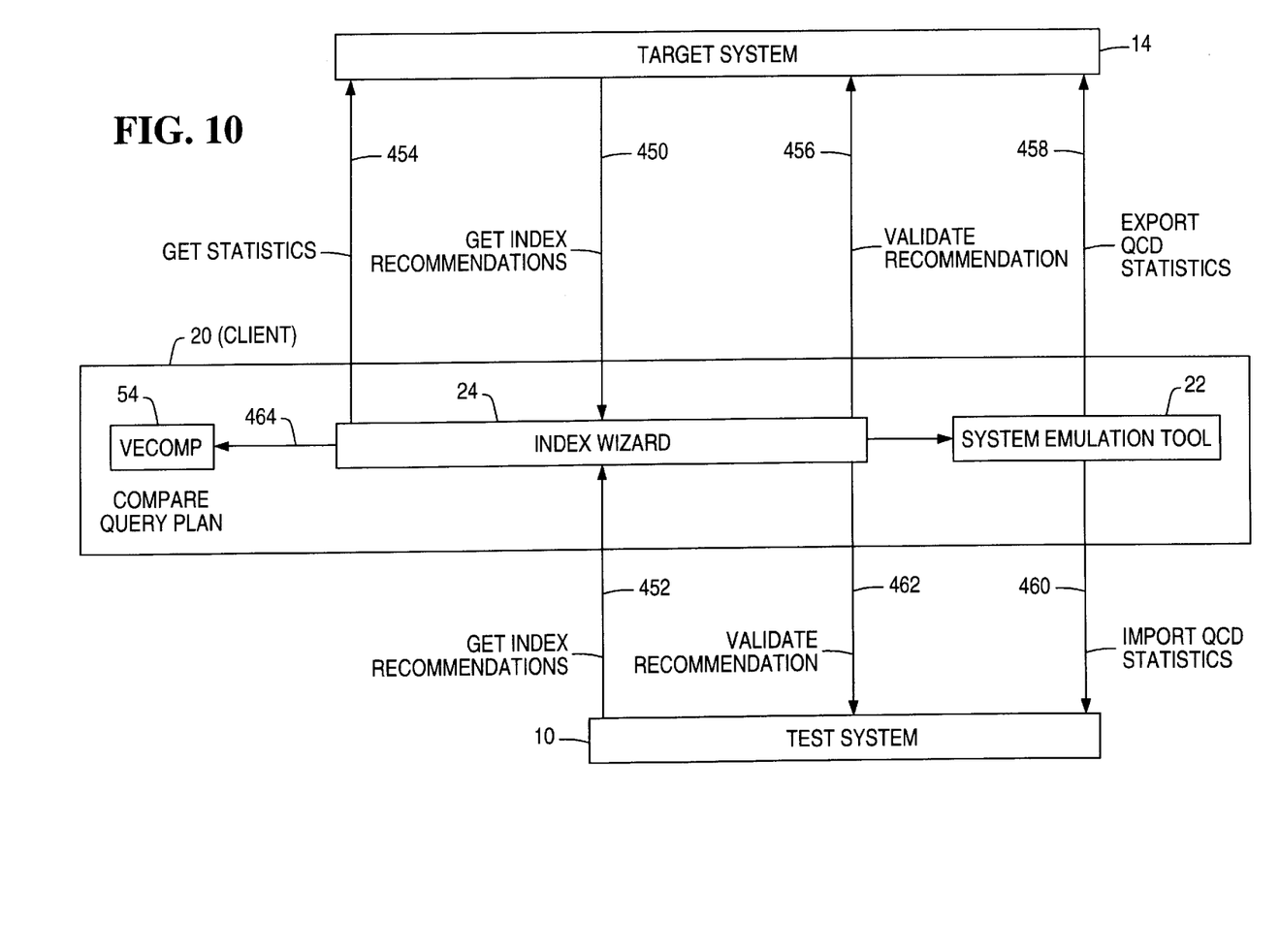

The index recommendations made by the index wizard server module 50 in the test system 10 are optionally validated before actually applying the recommendations on the target database system 14, as shown in FIG. 10. The index recommendations are retrieved (at 452) from the QCD 60 in the test system 10, or alternatively, the index recommendations are retrieved (at 450) from the target database system 14.

After the index recommendations are retrieved, the index wizard client module 24 submits commands (at 454) to capture statistics from the production system (one of the target database systems 14). The statistics can be captured using a new SQL COLLECT STATISTICS statement that collects statistics based on a specified percentage (less than 100%) of the entire table. Alternatively, a collect statistics mechanism that is based on a full table scan be used. The command(s) to capture statistics is issued at 454 (FIG. 10). The statistics collected, using either the sample technique or the full tables scan technique, are stored in the TableStatistics table 218 in the QCD.

The validation is performed on either the target system 14 or on the test system 10. If the test system 10 is used, the statistics collected are collected on the target database system 14, and the system emulation tool 22 exports (at 458) the statistics from the QCD in the target database system 14. The statistics are imported (at 460) into the QCD 60 in the test system 10.

After loading the statistics, the index wizard client module 24 issues a command (at 462) to perform validation of the indexes in the test system 10. In one embodiment, this statement is an SQL DIAGNOSTIC statement that enables an index validation mode for a given session level. In the index validation phase, the index recommendations are made available to the optimizer module 18 in the test system 10 for generating a query plan. During the validation phase, the modified plan that is based on the index recommendations is captured in the QCD 60 of the test system 10. The modified plan is compared with the original plan using the visual explain and compare module 42 or 54.

Alternatively, the validation can be performed in the target database system 14 (instead of the test system 10). In this case, the index wizard client module 24 submits the SQL DIAGNOSTIC statement (at 456) to the target database system 14 to perform validation. The optimizer module 19 produces different plans (with and without the recommended indexes) for comparison purposes. Also, if the validation is performed in the target database system 14, the exporting and importing of statistics (458, 460) are not performed.

The index wizard client module 24 invokes (at 464) the visual explain and compare module 54 to allow the user to compare the query plans with and without the index recommendations. In this way, the user can visualize the differences between the query plans.

Figure 11:
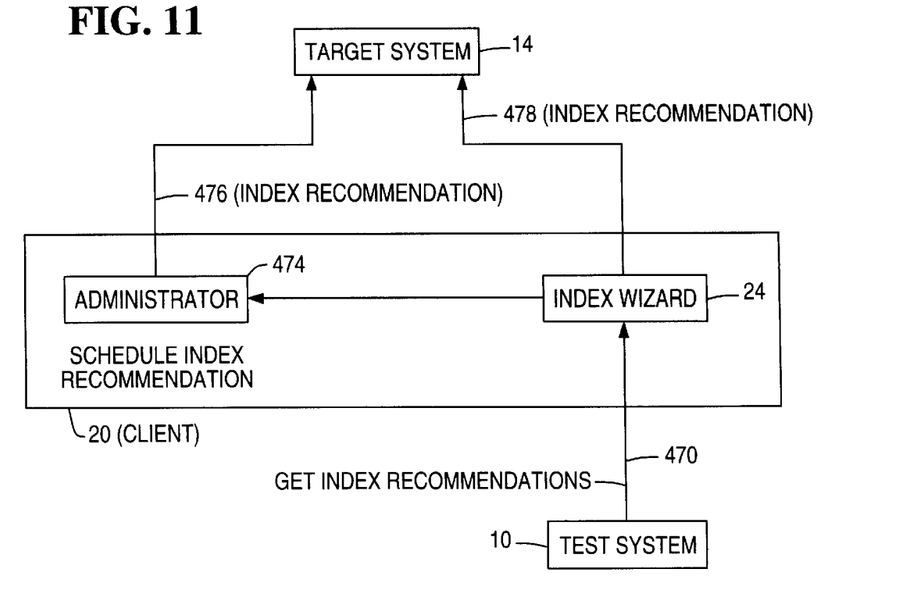

After the index recommendations have been validated, the user can choose to apply the recommendations. During the index analysis phase, DDL statements were generated as part of the index analysis to apply the recommendations. As shown in FIG. 11, the index wizard client module 24 reads (at 470) the index recommendations from the QCD 60 in the test system 10. Alternatively, the index wizard client module 24 reads the index recommendations from a target database system 14. A user, through the index wizard client module 24, is able to apply the index recommendations using a scheduling administrator tool 474. The DDL statements for the index recommendations are then communicated (at 476 from the administrator module 474 or at 478 directly from the index wizard client module 24) to the target database system 14 for execution. The scheduling administrator 474 allows the DDL statements to be executed at a later time.

Instructions of the various software routines or modules discussed herein (such as access modules 122, parsing engine 101, optimizer module 18 or 19, and so forth) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules and layers) are stored in respective storage units, which can be implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software modules or layers are loaded or transported to each device or system in one of many different ways. For example, code segments including instructions stored on floppy disks, CD or DVD media, a hard disk, or transported through a network interface card, modem, or other interface device are loaded into the device or system and executed as corresponding software modules or layers. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a parallel database system having a plurality of nodes, comprising:
   receiving a request to collect statistics of at least an attribute of a table distributed across the nodes, wherein receiving the request comprises receiving the request containing an indication that collecting statistics is to be based on a sample; and
   collecting statistics for the attribute based on reading a sample of rows of the table, the sample being less than all the rows of the table,
   wherein collecting the statistics is performed in parallel by software modules executing on corresponding nodes based on the sample of rows of the table distributed across the nodes.

2. The method of claim 1, wherein receiving the request comprises receiving the request containing a percentage value to indicate a percentage of all the rows of the table in the sample.

3. The method of claim 2, further comprising reading the indicated percentage of rows.

4. The method of claim 3, wherein the database system has multiple access modules in the nodes, the table being distributed across the multiple access modules,
   wherein reading the indicated percentage of rows comprises reading, by each access module in parallel with other access modules, the indicated percentage of a portion of the table associated with each access module.

5. The method of claim 4, wherein collecting the statistics comprises collecting the statistics in parallel by the software modules associated with the access modules.

6. The method of claim 5, further comprising storing the statistics collected from the access modules in a table.

7. The method of claim 4, wherein the database system has plural storage modules associated with corresponding access modules, the method further comprising:
   each access module in parallel with other access modules aggregating duplicate values of the attribute stored in a corresponding storage module; and
   each access module storing the aggregated values in a corresponding spool in the storage module associated with the access module,
   wherein collecting the statistics comprises collecting the statistics based on the aggregated values in the spools stored in plural storage modules.

8. The method of claim 7, further comprising:
redistributing the aggregated values of the spools across the plural access modules; and
performing further aggregation of the aggregated values in the spools after redistribution,
wherein collecting the statistics comprises collecting the statistics based on the further aggregated values after redistribution.

9. The method of claim 1, wherein aggregating duplicate values comprises performing a group-by operation on the attribute and counting a number of occurrences of each value of the attribute.

10. The method of claim 1, wherein collecting the statistics comprises collecting statistics in a plurality of intervals.

11. The method of claim 10, wherein collecting the statistics comprises indicating a maximum value of the at least one attribute in each interval.

12. The method of claim 11, wherein collecting the statistics further comprises indicating a value of the at least one attribute that occurs the most in the interval.

13. The method of claim 12, wherein collecting the statistics further comprises indicating a frequency of the value that occurs the most in the interval.

14. The method of claim 13, wherein collecting the statistics further comprises indicating a number of values that are not equal to the value that occurs the most in the interval.

15. The method of claim 14, wherein collecting the statistics further comprises indicating a number of rows that contain the values that are not equal to the value that occurs the most in the interval.

16. The method of claim 1, further comprising:
emulating the parallel database system based on emulation data of the parallel database system,
wherein receiving the request and collecting the statistics are performed in the emulated parallel database system.

17. The method of claim 16, further comprising receiving the emulation data to enable emulation of the parallel database system,
wherein the emulation data comprises cost-related information of the parallel database system.

18. An article comprising at least one storage medium containing instructions that when executed cause a database system having a plurality of nodes to:
receive a request to collect statistics of at least an attribute of a table distributed across the nodes, wherein the request contains an indication that collecting statistics is to be based on a sample; and
collect statistics for the at least one attribute based on reading a sample of rows of the table, the sample less than all the rows of the table,
wherein collecting the statistics is performed in parallel by software modules executing on corresponding nodes based on the sample of rows of the table distributed across the nodes.

19. The article of claim 18, wherein the instructions when executed cause the database system to collect statistics in a plurality of intervals.

20. The article of claim 19, wherein the instructions when executed cause the database system to collect statistics including a maximum value of the at least one attribute in each interval.

21. The article of claim 20, wherein the instructions when executed cause the database system to collect statistics including a mode value representing a most frequently occurring value in each interval.

22. The article of claim 21, wherein the instructions when executed cause the database system to collect statistics including a count representing a number of rows having the mode value.

23. The article of claim 22, wherein the instructions when executed cause the database system to collect statistics including another count representing a number of rows not having the mode value.

24. The article of claim 23, wherein the instructions when executed cause the database system to collect statistics including a number of values of the at least one attribute not equal to the mode value.

25. The article of claim 18, wherein the instructions when executed cause the database system to receive the request containing a percentage value to indicate a percentage of all the rows of the table in the sample.

26. The article of claim 25, wherein the instructions when executed cause the database system to read the indicated percentage of rows.

27. The article of claim 26, wherein the database system has multiple access modules in the nodes and the table is distributed across the multiple access modules, and wherein the instructions when executed cause the database system to read the indicated percentage of rows by reading the indicated percentage of a portion of the table associated with each access module.

28. The article of claim 27, wherein the instructions when executed cause the database system to collect the statistics in parallel by the software modules associated with the access modules.

29. The article of claim 18, wherein the database system has plural access modules in the nodes, and plural storage modules associated with corresponding access modules, the instructions when executed causing the database system to:
cause each access module to in parallel with other access modules aggregate duplicate values of the attribute stored in a corresponding storage module; and
cause each access module to store the aggregated values in a corresponding spool in the storage module associated with the access module,
wherein collecting the statistics comprises collecting the statistics in parallel by the software modules associated with the access modules based on the aggregated values in the spool stored in the plural storage modules.

30. The article of claim 29, wherein the instructions when executed further cause the database system to:
redistribute the aggregated values of the spools across the plural access modules; and
perform further aggregation of the aggregated values in the spool after redistribution,
wherein collecting the statistics comprises collecting the statistics based on the further aggregated values after redistribution.

31. An article comprising at least one storage medium containing instructions that when executed cause a database system to:
receive a request to collect statistics of at least an attribute of a table
collect statistics for the at least one attribute based on reading a sample of rows of the table, the sample less than all the rows of the table;
receive the request containing a percentage value to indicate a percentage of all the rows of the table in the sample;
read the indicated percentage of rows; and present a graphical user interface screen further containing a first field to receive the percentage value.

32. The article of claim 31, wherein the instructions when executed cause the database system to present the graphical user interface screen containing at least a second field to receive a second percentage value, the first field corresponding to a first table size; and the second field corresponding to a second table size.

33. A database system comprising:

a parsing engine to receive a request to collect statistics of at least one attribute of a table, wherein the request contains an indication that collecting statistics is to be based on a sample; and a module adapted to read a sample of rows of the table, the sample less than all the rows of the table, the module adapted to collect the statistics based on the sample of the rows of the table.

34. The database system of claim 33, wherein the module comprises an access module.

35. The database system of claim 34, further comprising:

at least another access module; and plural storage modules containing corresponding portions of the table, the access modules to manage data access to respective storage modules, each access module to read a sample of the table portion in the corresponding storage module and to collect statistics in parallel with at least another access module based on the sample.

36. The database system of claim 35, further comprising a user interface containing a first field to receive a percentage value indicating a size of the sample.

37. The database system of claim 36, wherein the user interface contains a second field to receive a second percentage value, the first and second fields corresponding to different table sizes.

* * * * *